US008882356B2

(12) United States Patent
Hattori et al.

(10) Patent No.: US 8,882,356 B2
(45) Date of Patent: Nov. 11, 2014

(54) HORIZONTAL SHAFT TYPE ROTARY MACHINE

(75) Inventors: Kenichi Hattori, Hitachiota (JP); Tadaaki Kakimoto, Hitachi (JP); Akitomi Semba, Hitachi (JP); Keiji Fugane, Hitachi (JP); Makoto Hemmi, Hitachinaka (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 0 days.

(21) Appl. No.: 13/405,898

(22) Filed: Feb. 27, 2012

(65) Prior Publication Data
US 2012/0155790 A1    Jun. 21, 2012

Related U.S. Application Data

(62) Division of application No. 12/463,650, filed on May 11, 2009, now abandoned.

(30) Foreign Application Priority Data

Jun. 10, 2008    (JP) .................................. 2008-151145

(51) Int. Cl.
F16N 1/00 (2006.01)
F16C 9/02 (2006.01)
F16C 33/10 (2006.01)
F16C 17/10 (2006.01)

(52) U.S. Cl.
CPC .............. *F16C 33/1065* (2013.01); *F16C 17/10* (2013.01); *F16C 33/1085* (2013.01)
USPC ........................................... 384/368; 384/294

(58) Field of Classification Search
USPC ......... 384/322, 368, 369, 371, 397, 400, 420, 384/423–426, 294, 429, 430
See application file for complete search history.

(56) References Cited

U.S. PATENT DOCUMENTS

| | | | | |
|---|---|---|---|---|
| 4,175,801 A | * | 11/1979 | Coil et al. | ..................... 384/429 |
| 5,529,399 A | | 6/1996 | Holze | |
| 6,149,310 A | | 11/2000 | Ono et al. | |
| 7,134,793 B2 | | 11/2006 | Thompson et al. | |
| 7,354,199 B2 | * | 4/2008 | Welch et al. | .................. 384/294 |

FOREIGN PATENT DOCUMENTS

| | | | |
|---|---|---|---|
| JP | 53-049652 A | | 5/1978 |
| JP | 56-023204 | | 3/1981 |
| JP | 58-088224 A | | 5/1983 |
| JP | 63-132114 | | 8/1988 |
| JP | 05-034316 | | 5/1993 |
| JP | 07-001332 | | 1/1995 |
| JP | 08-214490 A | | 8/1996 |
| JP | 11-055897 A | | 2/1999 |
| JP | 2008-95703 | * | 4/2008 |
| JP | 2008-95703 A | | 4/2008 |

* cited by examiner

*Primary Examiner* — James Pilkington
(74) *Attorney, Agent, or Firm* — Mattingly & Malur, PC

(57) ABSTRACT

A horizontal shaft type rotary machine capable of simply feeding oil into thrust bearing devices. Leak oil introduction is provided in the circumferential end parts of thrust bearing devices, for introducing leak oil of lubrication oil from horizontal type slide bearing devices onto slide surfaces of the thrust bearing devices. With this configuration, the thrust baring devices can be lubricated with the use of leak oil of lubrication oil from the horizontal type slide bearing devices, and as a result, it is possible to eliminate the necessity of an oil feed system exclusively used for the thrust bearing devices, thereby it is possible to simplify the pipe line arrangement of the oil feed system and the control of oil feed quantity.

3 Claims, 4 Drawing Sheets

HORIZONTAL SHAFT TYPE ROTARY MACHINE

This application is a divisional of U.S. patent application Ser. No. 12/463,650, filed May 11, 2009.

BACKGROUND OF THE INVENTION

The present invention relates to a horizontal shaft type rotary machine such as a rotary electric machine or a pump, and in particular, relates to a rotary machine incorporating horizontal type slide bearing devices for supporting a horizontal rotary shaft and thrust bearing devices for bearing a thrust force acting upon the horizontal rotary shaft.

There has been already proposed, as disclosed in, for example, JP-A-2008-95703 (FIGS. 4 and 5), a horizontal shaft type rotary machine incorporating horizontal type slide bearing devices for supporting a horizontal rotary shaft and thrust bearings device for bearing a thrust force acting upon the horizontal rotary shaft.

In the horizontal shaft type rotary machine of this kind, the thrust bearing devices are arranged adjacent to the horizontal type slide bearing devices. These thrust bearing devices are opposed to each other only below the center axis of thrust bearing parts formed on the horizontal rotary shaft, in order to bear the thrust exerted by the horizontal shaft with a pressure receiving area with necessity minimum.

BRIEF SUMMARY OF THE INVENTION

The rotary machine disclosed in JPA-2008-95703 is advantageous in view of the fact that the thrust force can be born by a pressure receiving area with a necessity minimum.

However, differently from the provision of an entire peripheral type thrust bearing device, a semi-peripheral type thrust bearing device requires an exclusive oil supply system for feeding a lubrication oil onto its slide surface, in addition to the oil feed system for the horizontal type slide bearing device.

Thus, there are required two kinds of oil feed systems and two kinds of control processes, resulting in the problems of the provision of complicated pipe lines in the oil feed systems, and the complication in control of the feed quantity of lubrication oil.

An object of the present invention is to provide a horizontal shaft type rotary machine which can facilitate the supply of oil into thrust bearing devices.

To the end according to the invention, a thrust bearing device is provided in its circumferential end parts with leak oil introduction means for introducing leak oil of lubrication oil from a horizontal type slide bearing device onto a slide surfaces of the thrust bearing device.

With the configuration as stated above, the lubrication for the thrust bearing device can be made by using the leak oil of the lubrication oil from the horizontal type slide bearing device, and as a result, no oil feed system exclusive for the thrust bearing device is required, thereby it is possible to simplify the arrangement of the pipe line of the oil feed system and the control for the feed quantity of lubrication oil.

Thus, it is possible to provide a horizontal shaft type rotary machine which is capable of feeding lubrication oil to the thrust bearing device in a simple manner.

Other objects, features and advantages of the invention will become apparent from the following description of the embodiments of the invention taken in conjunction with the accompanying drawings.

Figure 1:
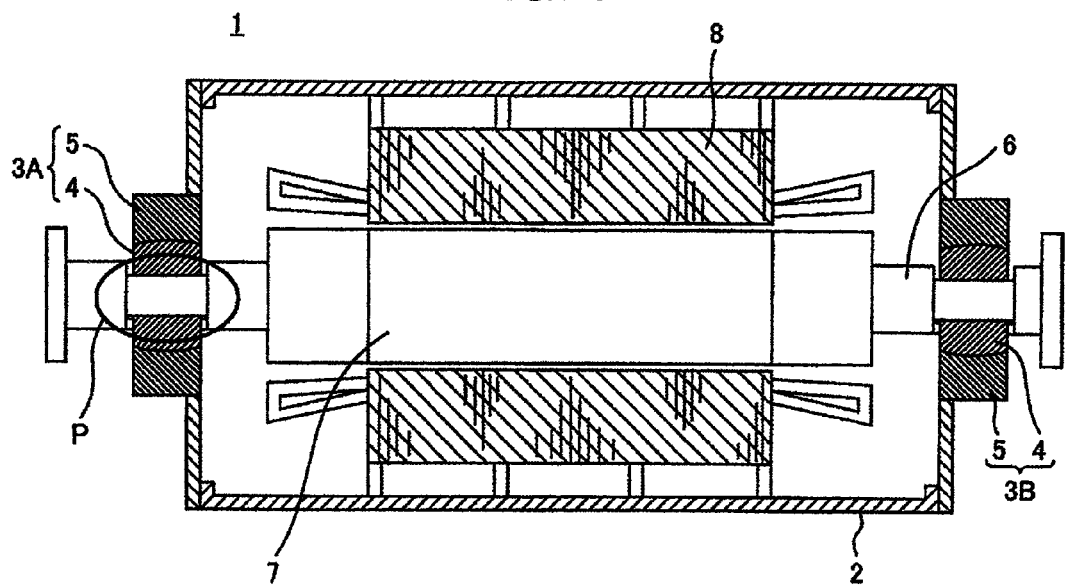
FIG. 1 is a schematic side view illustrating a turbine generator in a first embodiment of a horizontal shaft type rotary machine according to the invention.

In the above figures, reference numeral 1 denotes TURBINE GENERATOR, 2 HOUSING, 3A, 3B HORIZONTAL TYPE SLIDE BEARING, 4 BEARING METAL, 4S SLIDE SURFACE, 4F SPLIT SURFACE, 5 BEARING MEMBER, 6 HORIZONTAL ROTARY SHAFT, 6S THRUST BEARING PART, 7 ROTOR, 8 STATOR, 9 THRUST BEARING DEVICE, 9S SLIDE SURFACE, 9G OIL GROOVE, 10, 10A LEAK OIL INTRODUCTION SLOPE SURFACE, 11 LEAK OIL INTRODUCTION COVER, and 11A CONVENIENT COVER.

DETAILED DESCRIPTION OF THE INVENTION

Explanation will be made on the first embodiment of a horizontal shaft type rotary machine according to the present invention, based upon a turbine generator shown in FIGS. 1 to 4.

The turbine generator 1 comprises a housing 2 horizontally laid, horizontal type slide bearing devices 3A, 3B arranged at longitudinally opposite ends of the housing 2, a horizontal rotary shaft 6 slidably supported by the slide bearing devices 3A, 3B, a rotor 7 fixed to the horizontal rotary shaft 6, a stator 8 supported in the housing and opposed to the outer peripheral side of the rotor 7 with a gap therebetween.

Each of the slide bearing devices 3A, 3B has a bearing metal 4 which is formed at its inner periphery with a slide surface 4S and which has a vertically bi-split configuration, and a bearing member 5 slidably supporting the bearing metal 4 at the outer periphery of the latter. It is noted that the bearing metal 4 having a vertically bi-split configuration has upper and lower split surfaces 4F which are horizontally laid and which abut against each other with the center of the horizontal rotary shaft 6 as a boundary.

Further, semicircular ring-like thrust bearing devices 9 are arranged adjacent to the end parts of the slide bearing devices 3A, 3B and concentric with the horizontal rotary shaft 6 at positions where they are opposed to the lower halves of the slide bearing devices 3A, 3B. Further, the horizontal rotary shaft 4 is formed thereon with thrust bearing parts 6S opposed to the thrust bearing devices 9.

With this configuration, during normal operation of the turbine generator 1, the slide bearing devices 3A, 3B mainly support the rotor 7 including the horizontal rotary shaft 6, and thrust bearing devices 9 bear the rotor 7 which is therefore prevented from being axially shifted. Further, upon occurrence of a force for displacing the horizontal rotary shaft 6 due to variation in load or the like, the thrust bearing parts 6S of the horizontal rotary shaft 6 are moved into slidable contact with the thrust bearing devices 9 so as to resist against the force.

In the turbine generator 1 having the above-mentioned configuration, lubrication oil is fed onto the slide surfaces of the slide bearing devices 3A, 3B from an oil feed system which is not shown, and forms oil films between the slide surfaces and the horizontal rotary shaft 6 in order to allow the rotor 7 to rotate with low friction. The supply of the lubrication oil as stated above is continued so as to prevent the oil films from being broken, and the lubrication oil which flows subsequent to the formation of the oil films or the lubrication oil which has not contributed to the formation of the oil films, leaks outside from the opposite sides of the bearing metals 4. Thus, heretofore, the leak oil has to be collected for reusing or wasting.

However, in the configuration of this embodiment, there are provided oil grooves 9G which are formed in the slide surface 9S of each thrust bearing device 9 adjacent to the bearing metal 4 and which are substantially radially extended, at several positions in the circumferential direction, and also there are provided leak oil introduction slope surfaces 10 in the circumferential end parts of the slide surface 9S so as to constitute leak oil introduction means. Further, the leak oil introduction slope surfaces 10 are configured being inclined downward away from the horizontal type slide bearing devices 3A, 3B, in the circumferential end parts which are opposed to each other in the rotating direction of the horizontal rotary shaft 6. As a result, the leak oil from the slide bearing devices 3A, 3B which are opposed to the semicircular ring-like thrust bearing devices 9 is fed onto the slide surfaces 9S through the intermediary of the oil grooves 9G. Meanwhile, the leak oil from the upper halves of the slide bearing devices 3A, 3B leaks and flows downward from the end parts of the slide bearing devices 3A, 3B, and is then introduced onto the slide surfaces 9S by mans of the leak oil introduction slope surfaces 10 in the circumferential end parts of the thrust bearing devices 9.

With the configuration as stated above, the leak oil from the slide bearing devices 3A, 3B can efficiently contribute to the lubrication for the thrust bearing devices 9 with no provision of an exclusive oil feed system for the thrust bearing devices.

Figure 2:
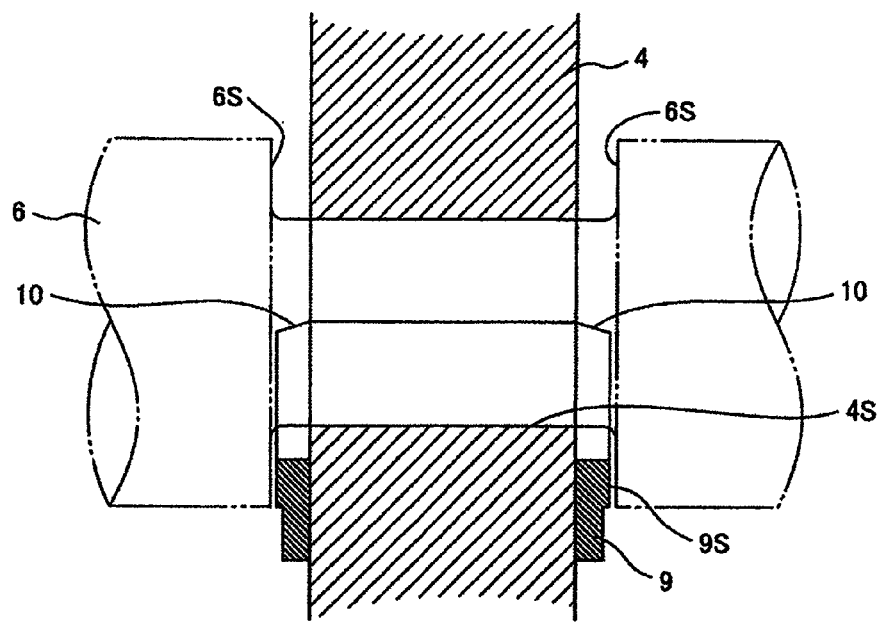
FIG. 2 is an enlarged view illustrating a portion P in FIG. 1.
Figure 3:
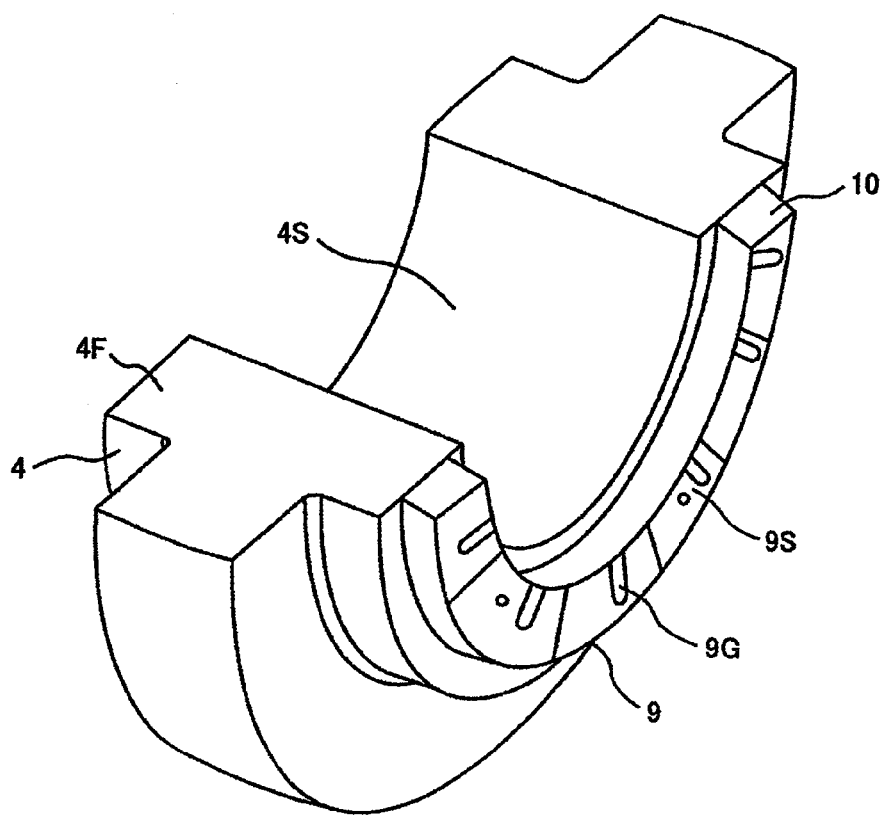
FIG. 3 is an enlarged perspective view illustrating a thrust bearing device shown in FIG. 2, in detail.
Figure 4:
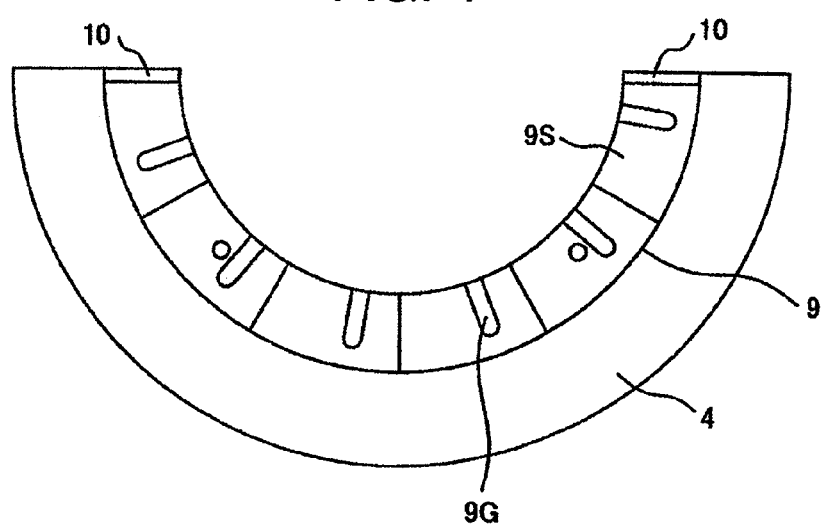
FIG. 4 is a front view illustrating the thrust bearing shown in FIG. 3.
Figure 5:
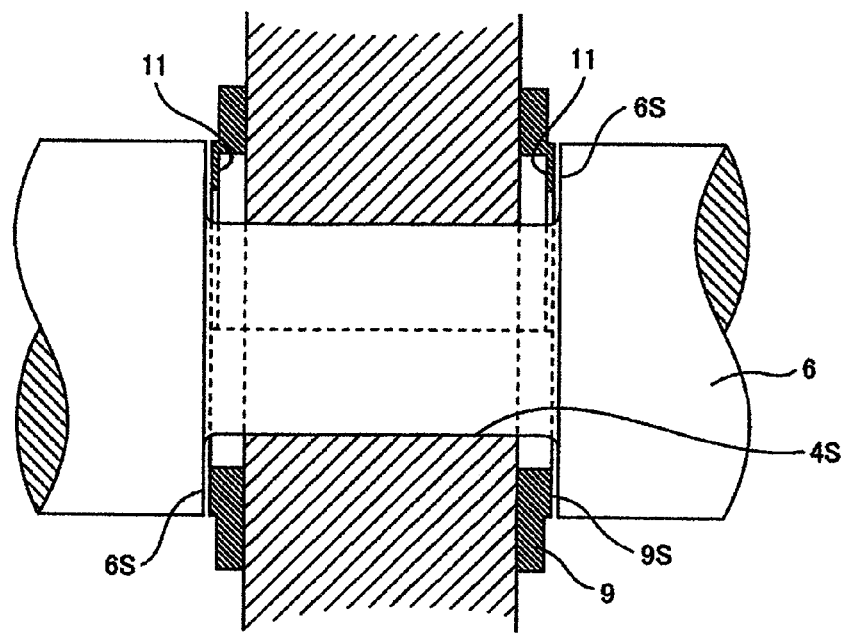
FIG. 5 is a view illustrating a second embodiment of the invention, corresponding to FIG. 2.
Figure 6:
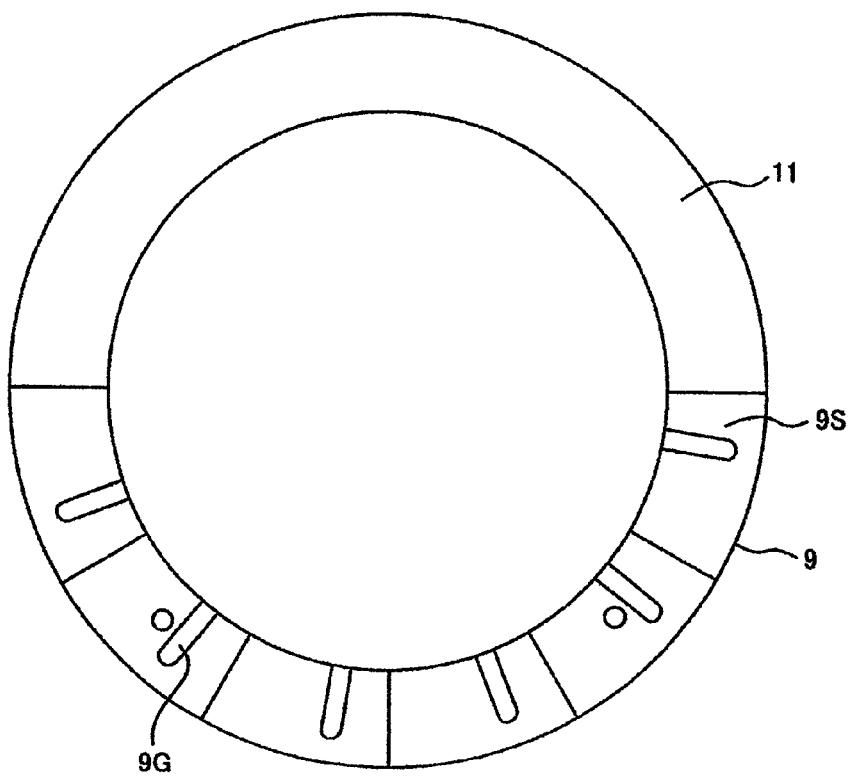
FIG. 6 is a view illustrating a portion around a thrust bearing device shown in FIG. 5.

FIGS. 5 and 6 show the configuration of a second embodiment of the invention, which corresponds to the configuration of the first embodiment shown in FIGS. 2 and 4. Thus, like reference numerals are used to denote like parts to those shown in FIGS. 2 and 4 in order to abbreviate the duplicated explanation thereto.

In the configuration of the second embodiment, as the leak oil introduction means for the slide surface 9S of the thrust bearing device 9, semicircular ring-like leak oil introduction covers 11 are provided so as to cover the axial end parts of the slide bearing devices 3A, 3B, and are extended from the circumferential end parts of the thrust bearing device 9 on the side above the center axis of the thrust bearing parts 6S with no provision of the leak oil introduction slope surfaces 10 in the circumferential end parts of the slide surface 9S.

With this configuration, leak oil from the upper halves of the slide bearing devices 3A, 3B is led downward from and trapped below the end parts of the slide bearings 3A, 3B by the leak oil introduction covers 11, and the thus trapped leak oil is then led onto the slide surfaces 9S from the circumferential end parts of the thrust bearing devices 9 since the trapped leak oil cannot flow in any other way.

Accordingly, even the configuration of this embodiment can exhibit technical effects and advantages similar to those obtained by the configuration of the first embodiment.

Next, explanation will be made of the configuration of a third embodiment of the present invention with reference to FIGS. 7 and 8. The configuration of the third embodiment is a variant of the configurations of the first and second embodiments of the present invention, and accordingly, like reference numerals are used to denote like parts to those shown in FIGS. 1 to 6 in order to abbreviate duplicated explanation thereto.

The configuration of the third embodiment is different from the first embodiment in that leak oil introduction slope surfaces 10A are formed in the circumferential end parts of the slide surface 9S on the inner diameter side, which is opposed to the thrust bearing parts 6S of the horizontal rotary shaft 7, with no provision of the leak oil introduction slope surfaces 10 which extends over the entire width of the slide surface 9S at the circumferential end parts of the slide surface 9S, and is different from the second embodiment in that semicircular disc convenient covers 11A are provided, instead of the semicircular disc-like leak oil introduction covers 11.

Figure 7:
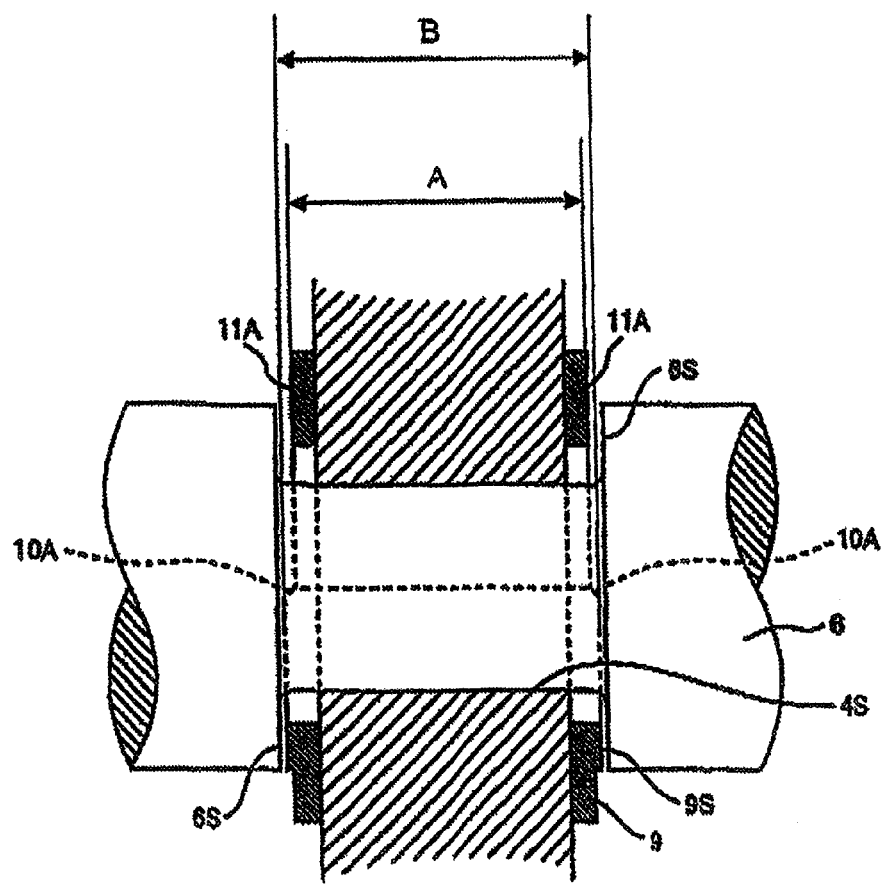
FIG. 7 is a view illustrating a third embodiment of the invention, corresponding to FIG. 2.
Figure 8:
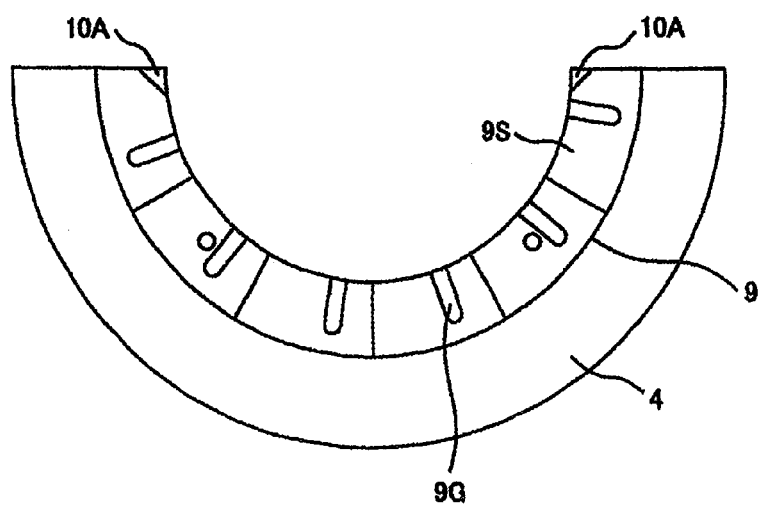
FIG. 8 is a front view illustrating a portion around a thrust bearing device shown in FIG. 7.

As seen in FIG. 7, a combined width A of the upper bearing slide surface and the adjacent first and second semicircular disk convenience covers 11A, which each have an axial inner face in contact with one of the axial outer faces of the upper half of the horizontal, vertically split type slide bearing device, is less than a combined width B of the lower bearing slide surface and the thrust bearing slide surfaces 9S of the adjacent thrust bearing devices 9. As a result, a spacing distance of an outer axial face of each one of the semicircular disk convenience covers 11A, from an adjacent one of the thrust bearing surfaces 6S of the rotary shaft 6 is greater than a corresponding spacing distance of each thrust bearing slide surface 9S from its adjacent thrust bearing surface 6S of the rotary shaft. Thus, as discussed previously, upon the occurrence of a force for displacing the horizontal shaft 6, due to variation in load or the like, the thrust bearing parts 6S of the horizontal rotary shaft 6 are moved into slidable contact with the thrust bearing devices 9 to resist the force.

With this configuration, the leak oil from the upper halves of the slide bearing devices 3A, 3B is led downward along the inner periphery of the convenient covers 11A, and is then led into the gaps between the slide surfaces 9S of the thrust bearing devices 9 and the thrust bearing parts 6S by way of the leak oil introduction slope surfaces 10A opposed to the thrust bearing parts 6S in an efficient manner.

Thus, even the configuration of this embodiment can exhibit technical effects and advantages similar to those obtained by the configuration of the first embodiment. It is noted in this embodiment that the lubrication oil can be introduced by a larger quantity onto the slide surface 9S since the leak oil introduction slope surfaces 10A are formed on the side opposed to the thrust bearing parts 6S of the horizontal rotary shaft 7, and accordingly, this embodiment is advantageously used for horizontal shaft type rotary machines of the kind that the lubrication oil is required by a large quantity.

By the way, although explanation has been made of such that the leak oil introduction slope surfaces 10 and the leak oil introduction covers 11 are solely use respectively in the first and second embodiments, there may be used them in combination. Further, it goes without saying that they may be used in combination with the leak oil introduction slope surfaces 10A and the convenient covers 11A in the configuration of the third embodiment selectively in dependence upon a feed oil quantity.

Further, in the first and third embodiments, although there have been explained the configurations that the leak oil introduction slope surfaces 10 or the leak oil introduction slope surfaces 10A are formed on both circumferential end parts of the thrust bearing devices 9, the leak oil introduction slope surface 10 or the leak oil introduction surface 10A may be formed only on the side opposed to the direction of the rotation of the horizontal rotary shaft in the case that the direction of rotation of the horizontal shaft type rotary machine is fixed.

It is noted that explanation has been made of the turbine generator as an example of the horizontal shaft type rotary machine. However, it goes without saying that the present invention can be applied to any kind of horizontal shaft type rotary machines in which thrust bearings are arranged adjacent to the horizontal type slide bearing devices, irrespective of a kind of the horizontal shaft type machine.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A horizontal shaft type rotary machine comprising:
   a horizontal rotary shaft having axially spaced first and second thrust bearing faces;
   a horizontal, vertically split type slide bearing device supporting the horizontal rotary shaft and having an upper bearing half and a lower bearing half, each of the upper bearing half and the lower bearing half including an arcuate slide surface extending axially between first and second axially spaced bearing half end faces and extending circumferentially between opposite bearing half split surfaces;
   a separate semicircular thrust bearing device adjacent each of the first and second axially spaced bearing half end faces of only the lower bearing half of the horizontal type slide bearing device, each separate semicircular thrust bearing device having an axially outer slide surface positioned only below a center axis of the horizontal rotary shaft, opposed to, and spaced at a first spacing distance from an adjacent one of the first and second axially spaced thrust bearing faces of the horizontal rotary shaft and each being engageable with the adjacent one of the first and second thrust bearing faces of the horizontal rotary shaft in response to an axial thrust load imposed on the horizontal rotary shaft;
   a thrust bearing circumferential end face of each separate semicircular thrust bearing device being positioned adjacent a respective one of the split surfaces of the lower bearing half of the horizontal, vertically split type slide bearing device;
   a leak oil introduction slope surface formed on an inner diameter side of each thrust bearing circumferential end face of each separate semicircular thrust bearing device, and positioned adjacent an inner diameter side of each split surface of the lower bearing half of the horizontal, vertically split type slide bearing device, each leak oil introduction slope surface facing one of the first and second thrust bearing faces of the horizontal rotary shaft to direct a flow of leak oil of lubrication oil from the arcuate slide surface of the lower bearing half of the horizontal, vertically split type slide bearing device onto the slide surface of the semicircular thrust bearing device;
   first and second semicircular disk covers, each having an axial inner face which is positioned in contact with a respective one of the first and second axially spaced bearing half end faces of the upper bearing half of the horizontal, vertically split type slide bearing device and above the center axis of the horizontal rotary shaft, and with each of the first and second semicircular disk covers extending between the circumferentially opposite bearing half split surfaces of the upper bearing half and with the axial inner face of each of the first and second semicircular disks covering the one of the first and second axial outer end faces of the upper half of the horizontal, vertically split type slide bearing device to direct leak oil flow downwardly between the inner periphery of each of the separate first and second semicircular disk covers and the axial outer end face of the respective one of the axially spaced bearing half end faces of the upper bearing half of the horizontal, vertically split slide bearing device, through the leak oil introduction slope surfaces and onto the slide surfaces of the trust bearing device; and
   an axial outer face of each one of the first and second semicircular disk covers being spaced at a second spacing distance from an adjacent one of the first and second thrust bearing faces of the horizontal rotary shaft, each second spacing distance being greater than the first spacing distance.

2. The horizontal shaft type rotary machine according to claim 1, wherein the axial inner face of each one of the first and second semicircular disk covers is continuously opposed to the respective axial outer end face of the upper bearing half of the horizontal, vertically split type slide bearing device and above the center axis of the horizontal rotary shaft.

3. A horizontal shaft type rotary machine comprising:
   a horizontal rotary shaft having axially spaced first and second thrust bearing faces;
   a horizontal, vertically split type slide bearing device supporting the horizontal rotary shaft and having an upper bearing half and a lower bearing half, each of the upper bearing half and the lower bearing half including an arcuate slide surface extending axially between first and second axially spaced bearing half end faces and extending circumferentially between opposite bearing half split surfaces;
   a separate semicircular thrust bearing device adjacent each of the first and second axially spaced bearing half end faces of only the lower bearing half of the horizontal type slide bearing device, each separate semicircular thrust bearing device having an axially outer slide surface positioned only below a center axis of the horizontal rotary shaft, opposed to, and spaced at a first spacing distance from an adjacent one of the first and second axially spaced thrust bearing faces of the horizontal rotary shaft and each being engageable with the adjacent one of the first and second thrust bearing faces of the horizontal rotary shaft in response to an axial thrust load imposed on the horizontal rotary shaft;
   a thrust bearing circumferential end face of each separate semicircular thrust bearing device being positioned adjacent a respective one of the split surfaces of the lower bearing half of the horizontal, vertically split type slide bearing device;
   oil grooves formed in the axially outer slide surface of each separate thrust bearing device for introducing leak oil of lubrication oil from the lower bearing half of the horizontal, vertically split type slide bearing device onto the axially outer slide surface;
   a leak oil introduction slope surface formed on an inner diameter side of each thrust bearing circumferential thrust face of each separate semicircular thrust bearing device, and positioned adjacent an inner diameter side of each split surface of the lower bearing half of the horizontal, vertically split type slide bearing device, each leak oil introduction slope surface facing one of the first and second thrust bearing faces of the horizontal rotary shaft to direct a flow of leak oil of lubrication oil from the arcuate slide surface of the lower bearing half of the horizontal, vertically split type slide bearing device onto the slide surface of the semicircular thrust bearing device;

first and second semicircular disk covers, each having an axial inner face which is positioned in contact with a respective one of the first and second axially spaced bearing half end faces of the upper bearing half of the horizontal, vertically split type slide bearing device and above the center axis of the horizontal rotary shaft, and with each of the first and second semicircular disk covers extending between the circumferentially opposite bearing half split surfaces of the upper bearing half and with the axial inner face of each of the first and second semicircular disks covering the one of the first and second axial outer end faces of the upper half of the horizontal, vertically split type slide bearing device to direct leak oil flow downwardly between the inner periphery of each of the separate first and second semicircular disk covers and the axial outer end face of the respective one of the axially spaced bearing half end faces of the upper bearing half of the horizontal, vertically split slide bearing deice, through the leak oil introduction scope surfaces and onto the slide surfaces of the thrust bearing device; and an axial outer face of each one of the first and second semicircular disk covers being spaced at a second spacing distance from an adjacent one of the first and second thrust bearing faces of the horizontal rotary shaft, each second spacing distance being greater than the first spacing distance.

* * * * *